Jan. 14, 1964 A. V. POHM ETAL 3,117,885

TAPERED MAGNETIC FILM CORES

Filed June 14, 1960 2 Sheets-Sheet 1

INVENTORS
ARTHUR V. POHM
WILLIAM W. DAVIS
BY Cushman, Darby & Cushman
ATTORNEYS

Jan. 14, 1964 | A. V. POHM ETAL | 3,117,885
TAPERED MAGNETIC FILM CORES
Filed June 14, 1960
2 Sheets-Sheet 2
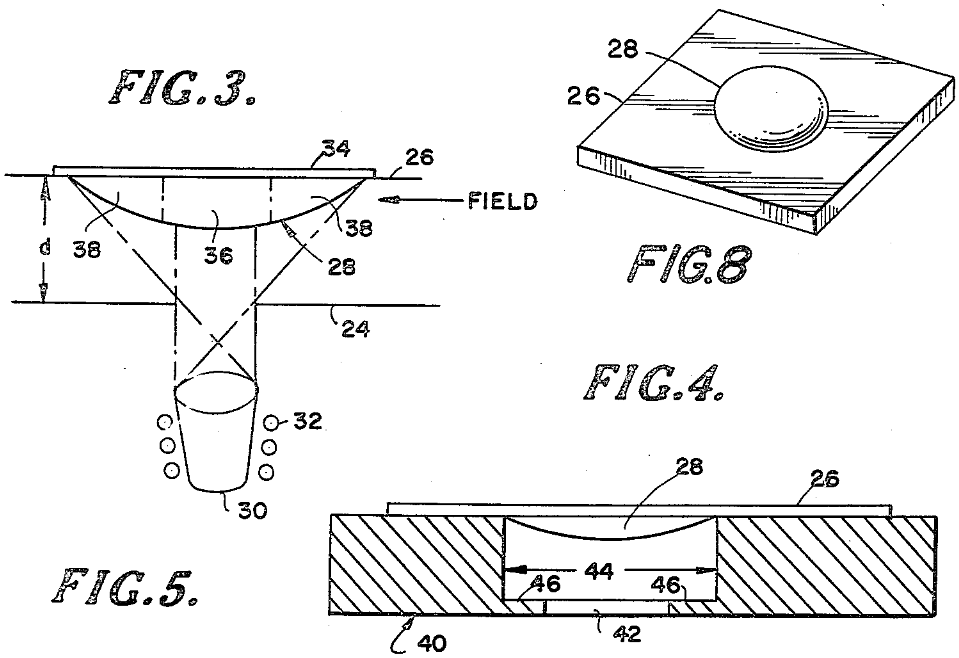
FIG. 3, FIG. 8, FIG. 4, FIG. 5
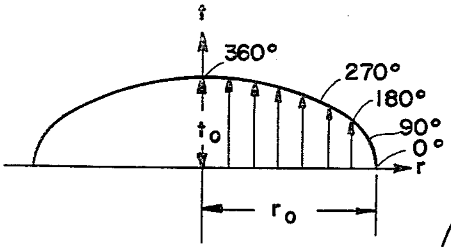
FIG. 6.
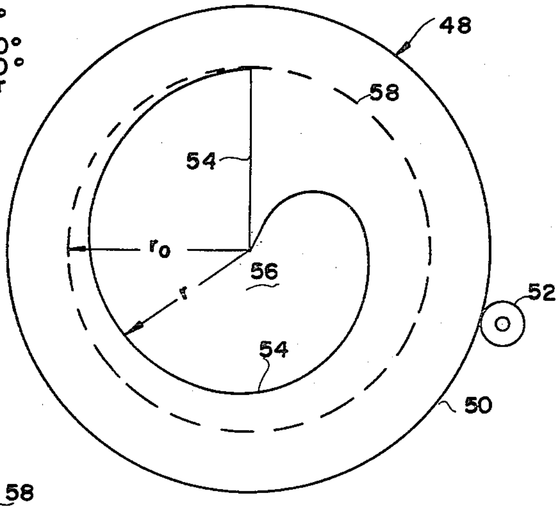
FIG. 7.
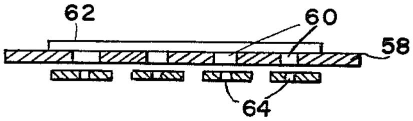
INVENTORS
ARTHUR V. POHM
WILLIAM W. DAVIS
BY Cushman, Darby & Cushman
ATTORNEYS 3,117,885
Patented Jan. 14, 1964

1

3,117,885

TAPERED MAGNETIC FILM CORES

Arthur V. Pohm, Ames, Iowa, and William W. Davis, Minneapolis, Minn., assignors to Sperry Rand Corporation, New York, N.Y., a corporation of Delaware Filed June 14, 1960, Ser. No. 36,013
2 Claims. (Cl. 117—37)

This invention relates generally to magnetic film-type cores for use in digital computing machines or the like, and more specifically to forming multistable, especially bistable, thin ferromagnetic film cores so as to decrease to a marked degree the average and maximum demagnetizing fields present in cores of this type, thereby greatly improving the switching characteristics of such cores. The invention also concerns the resulting film product as well as the process and apparatus for so forming films.

When a sample of ferromagnetic material is magnetized by an applied field, the edges of the sample carry free magnetic poles which themselves set up local magnetic fields in all parts of the sample. Normally, these fields are directed in the opposite direction to the applied field and are therefore conventionally termed "demagnetizing fields." Since the demagnetizing fields existing in a magnetized sample act in opposition to the applied field, in order to remagnetize such samples as in the storage cells of a magnetic memory it becomes necessary to increase the drive field requirements over that which would be needed if there were no demagnetizing fields present, to achieve the same relative switching speeds.

It has been found that if the magnetic sample if formed such that its edges are tapered uniformly for a predetermined length to a zero thickness, the local field density produced by the free poles is substantially reduced. As a result, both the average demagnetizing field and the maximum demagnetizing field in the sample are also reduced. When the magnetic sample is grown during a deposition process, such as may be the case for a thin film tapering of the film edge can be accomplished during that process.

It is accordingly an object of the present invention to provide an improved multistable magnetic film element.

Another object of this invention is to provide a process and means for substantially reducing the demagnetizing field existing in prior art magnetic film elements.

Yet another object of this invention is to provide a process and means for reducing the free pole effect of magnetic film elements by tapering the edges thereof during their deposition.

Still another object of the present invention is to provide means for producing film elements having appropriately tapered edges.

Other objects and advantages of this invention will become obvious to those having ordinary skill in the art by reference to the following detailed description of exemplary embodiments of the apparatus and the appended claims. The various features of the exemplary embodiments may best be understood with references to the following drawings, wherein:

FIGURE 3 illustrates one way of forming magnetic films having tapered edges;

FIGURE 4 shows an alternative type mask for forming tapered ferromagnetic film elements;

FIGURE 5 is a cross sectional view of an ideally shaped film;

FIGURE 6 shows the shape of a baffle or mask used to obtain a film having the cross-section of FIGURE 5;

FIGURE 7 illustrates apparatus for obtaining an array of ideally shaped films; and

2

FIGURE 8 is a perspective view of film, the cross section of which is shown in FIG. 5, the numerical designations being the same as those found in FIG. 3.

A factor which becomes important in the dynamic magnetic behavior of thin film storage elements, is the maximum demagnetizing field existing in the film. The reason for this is that in the presence of high local fields, the domain walls tend to nucleate, i.e., the high local fields tend to reverse the direction of magnetization of proximate domains.

Figure 1:
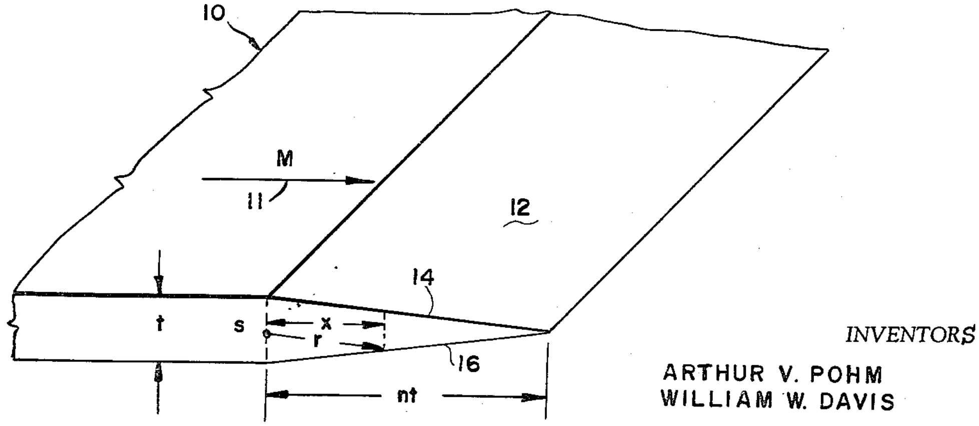
FIGURE 1 illustrates a model used to calculate the maximum demagnetizing field.

In order to obtain an approximate notion of the maximum demagnetizing field which may exist inside of a film having tapered edges, consider FIGURE 1. The partially illustrated magnetic sample 10 is assumed to have a thickness $t$, an infinite width, and a saturation magnetization $M_s$ with the remanent magnetization M being directed as shown along the easy axis 11. The sample is also assumed to be sufficiently long (in the direction of the easy axis) so that demagnetizing field contributions from the opposite edge can be neglected. It should be understood that the shape of the sample 10 is not necessarily the desired shape for a thin film, but is included herein because of the simplified computational approximations which result. In reality, the tapered edge 12 would usually not have its upper side 14 sloping unless the normally flat substrate (not shown) onto which the film is deposited were so formed. Side 16 of the taper would be sloped however.

The length of the taper 12 from mid-point $s$ is assumed to be $nt$, while the variable is the instantaneous point-to-point distance from $s$ to side 16, and $x$ is the horizontal component of $r$. Consequently, $$r^2=x^2+\left(\frac{t}{2}-\frac{x}{2n}\right)^2$$

The maximum demagnetizing field $H_m$ at point $s$ may then be expressed by the equation:

$$H_M=\frac{M_st}{nt}\int_0^{nt}\frac{x}{x^2+\left(\frac{t}{2}-\frac{x}{2n}\right)^2}dx$$

and for $n>10$ $$H_M\cong\frac{M_s}{n}\ln 2n$$

It can be seen from this equation that the maximum demagnetizing field is diminished as the edges of the sample are made less abrupt.

If one considers a 0.2 cm. long deposited film element of infinite width and 2000 A. thick having an edge that uniformly tapers off in 0.01 cm. (relatively abrupt, $n$ equals 500) using the above equation, the magnitude of the maximum demagnetizing field is approximately as follows:

$$H_M=11.0 \text{ oersteds}$$

and it can be shown the average demagnetizing field is approximately:

$$H_A=0.95 \text{ oersted}$$

However, if the edge of that same film had been made to taper off uniformly in adistance of 0.05 cm. ($n$ equals 2500), the following approximate demagnetizing fields result:

$$H_M=2.0 \text{ oersteds}$$
$$H_A=0.58 \text{ oersted}$$

The minimum values for maximum and average demagnetizing fields would result if a film had the shape of an oblate ellipsoid. With such an ideal shape $n$ would be maximum since the taper would be fully from center to periphery of edge. From an oblate ellipsoidal film of 0.2 cm. diameter and 2000 A. maximum thickness ($n$ equals 5000), the following approximate values for the average and maximum demagnetizing fields would be obtained:

$$H_M = 0.53 \text{ oersted}$$
$$H_A = 0.53 \text{ oersted}$$

Figure 2:
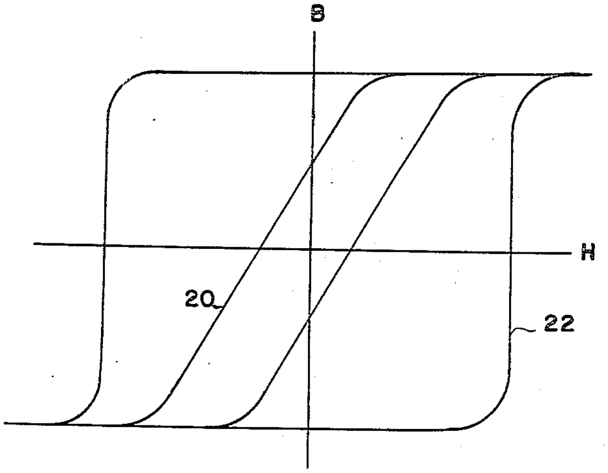
FIGURE 2 illustrates the shape of hysteresis loops of a magnetic film element having tapered edges.

When a "thin" ferromagnetic multistable film is vapor deposited onto a substrate in any one of the known ways, for example as described in the Rubens Patent No. 2,900,282, to a thickness of approximately 1 micron (10,000 A.) and a diameter of 1 cm. without provision for tapering the film edges, experiments on such a film may produce a hysteresis characteristic similar to loop 20 of FIGURE 2. It can be seen that loop 20 is relatively narrow and sheared considerably due to the presence of relatively large demagnetizing fields. However, when films are deposited as described hereinbelow so that their edges are tapered out, loops similar in appearance to loop 22 of FIGURE 2 are found to exist. In fact it had further been experimentally determined that, depending on the magnitude and time occurrence of the fields applied to a sample having tapered edges, characteristics similar to both loop 20 and loop 22 can be observed in the same example.

The explanation of why one can obtain two substantially different loops on a single film resides in the domain structure, and in the magnetic behavior near the edges of the film. For a type 20 loop, the sample is always polydomain, with quite large reverse-domain areas present even when the externally applied field is zero. The reverse-domain areas can be made to shrink by applying an external field, but if this field is not made too large, small reverse domain spikes are left near the edges. Now when the external field is again reduced to zero, the reverse domain spikes grow under the influence of the demagnetizing field, resulting in a partial demagnetization of the sample. However, if the external field is made sufficiently large, the reverse domain spikes are completely removed, and then the external field may be reduced to zero without demagnetizing the sample to any appreciable extent. In fact, a substantially large reverse field is required to nucleate reverse domains. If this reverse or nucleation field is sufficiently large the magnetization of the sample will be completely reversed with no further increase in field strength although reverse domain spikes may be left once again.

Up to this point it has been rather clearly shown that the magnetic properties of thin ferromagnetic memory film type elements may be improved by tapering the edges thereof, without discussing the ways by which such films may be produced. Although several embodiments are included herein, limitation thereto is not intended.

In FIGURE 2 of the above mentioned Rubens Patent, there is illustrated evaporation condensation, bistable film vacuum deposition apparatus, and apparatus of that type is diagrammatically illustrated in FIGURE 3 of the present application with mask 24 being displaced a predetermined distance $d$ from substrate 26 on which it is desired to deposit the film core 28 instead of being contiguous therewith as in the said Rubens patent. When the metallic vapors effected from the melt in crucible 30 by heater coils 32, are directed through aperture 23 in mask 24 onto substrate 26 whose temperature is controlled by heater 34, the vapors condense and "freeze" on the substrate in the form indicated such that a film results which is substantially thicker in its midportion 36 than at any point in its taper shaped edges 38. Preferably, aperture 23 is of circular configuration so that the base or plan configuration of film 28 is also circular but of course of larger diameter than aperture 23.

In looking at film 28 in FIGURE 3 from the substrate viewpoint, one will note the non-substrate or exposed surface of the film is generally concave at least as present in a film cross section taken vertically along the easy axis resulting from the applied field. If aperture 23 is circular, then the lower film surface of any cross section perpendicular to the substrate would be generally concave. Of course, looking at the film from the other direction, i.e., from crucible 30, the exposed film surface appears generally convex. As a whole, the film may be thought of as having a shape like a plano-convex lens, of circular plan view if apertive 23 is circular. Since substrate 26 is flat, its ends on which tapered edges 38 freeze and those edges themselves form a straight angle with the central portion of the substrate and the substrate surface of the film midportion 36. The lower surfaces of edges 38 are sloping, slanting or aslant, as you will, relative to the substrate surfaces thereof and form an acute angle therewith.

The above masking technique has a disadvantage in that the base periphery of the resulting film may not be well defined. To overcome this disadvantage, use may be made of the integral mask 40 shown in FIGURE 4. In this case the substrate 26 is in direct contact with the mask, which has a pair of annular openings 42 and 44 of different diameters. The larger diameter of aperture 44 defines the diameter of the film 28, while the size of aperture 42, determined by the distance between integral shoulders 46, determines the degree of taper which the film will have.

As above indicated, for minimum demagnetizing fields in a thin film element, the ideal shape thereof is that of an oblate ellipsoid, which, as is well known is the solid generated by revolving an ellipse about its minor axis. To make a small dimensioned thin film in the form of such a solid would, however, be expensive and difficult especially when considering depositions of an array of films at one time, though it may be substantially accomplished by cupping the substrate appropriately in conjunction with the following considerations. Generally it is preferable to make the film have a shape like only the one-half part of an oblate ellipsoid divided along the plane of its major axis. In such a case, the film has a central vertical cross section as shown in FIGURE 5.

A mask 48 for effecting deposition of a one half oblate ellipsoid may be in plan view as shown in FIGURE 6. That is, when the rim 50 of the mask is rotated by rim driver 52 (for example at a speed of about 100 r.p.m.) during a film evaporation process, the resulting film has a cross section similar to that shown in FIGURE 5 due to the configuration of the periphery 54 of aperture 56. The radius $r_0$ of the resulting film is that for broken line 58. If the maximum film thickness $t_0$, i.e., the thickness along its minor axis, is considered as 360° with a zero thickness at 0° any inbetween thickness $t$ at a radius $r$ may be determined by the following formula:

$$\left(\frac{t}{t_0}\right)^2+\left(\frac{r}{r_0}\right)^2=1$$

If $\theta$ is measured in radians in a clockwise direction in FIGURE 6, then the film thickness at any point is related to its maximum thickness by the fractional angle which is intercepted by the mask, in accordance with the following equation:

$$t=t_0\left(1-\frac{\theta}{2\pi}\right)$$

Eliminating $t$ and $t_0$ from these two equations gives the equation for the mask aperture periphery 54 in FIGURE 6 as follows:

$$r=r_0\sqrt{1-\left(1-\frac{\theta}{2\pi}\right)^2}$$

Since the mask 48 of FIGURE 8 must be spaced from the substrate to allow relative rotation therebetween, the film diameter may need better definition. This can be accomplished by placing a separate stationary mask in direct contact with the substrate between the rotatable mask and substrate. To deposit a plurality of ideally shaped thin films simultaneously, a mask 59 in FIGURE 7 with a like plurality of film diameter defining apertures 60 may be placed in direct contact with substrate 62, while rotatable masks 64, each as in FIGURE 6, are appropriately spaced therefrom.

Thus it is apparent that the various objects and advantages herein set forth are successfully achieved.

Modifications of this invention not described herein will become apparent to those of ordinary skill in the art after reading this disclosure. Therefore, it is intended that the matter contained in the foregoing descripiton and the accompanying drawings be interpreted as illustrative and not limitative, the scope of the invention being defined in the appended claims.

What is claimed is:

1. A multistable magnetic film mounted on and in contact with the surface of a substantially planar substrate, the plane of the film being parallel to the plane of the substrate, the film being particularly characterized in that it is in the form of one-half part of an oblate ellipsoid divided along the plane of its major axis, the contact between said substrate and said film being along the plane of the major axis of the film.

2. A multistable magnetic film mounted on and in contact with the surface of a planar substrate with the plane of the film being parallel to the plane of the substrate, the film having a planar surface and having a cross section which is shaped substantially as the one-half part of an ellipse, the contact between said substrate and said film being along the entire extent of the said planar surface of said film.

References Cited in the file of this patent

UNITED STATES PATENTS

| | | |
|---|---|---|
| 2,160,981 | O'Brien | June 6, 1939 |
| 2,810,663 | Reynolds et al. | Oct. 22, 1957 |
| 2,853,402 | Blois | Sept. 23, 1958 |
| 2,898,241 | Charlton et al. | Aug. 4, 1959 |
| 2,900,282 | Ruebens | Aug. 18, 1959 |